United States Patent
Yamamoto et al.

(10) Patent No.: US 12,481,039 B2
(45) Date of Patent: Nov. 25, 2025

(54) PHOTOELECTRIC SENSOR AND OPTICAL RANGEFINDER

(71) Applicant: HOKUYO AUTOMATIC CO., LTD., Osaka (JP)

(72) Inventors: Akihito Yamamoto, Osaka (JP); Takahiro Kasahara, Osaka (JP); Satoshi Arima, Osaka (JP); Tatsuhiro Momodori, Osaka (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 268 days.

(21) Appl. No.: 18/019,699

(22) PCT Filed: Aug. 18, 2021

(86) PCT No.: PCT/JP2021/030146
§ 371 (c)(1),
(2) Date: Feb. 3, 2023

(87) PCT Pub. No.: WO2022/039186
PCT Pub. Date: Feb. 24, 2022

(65) Prior Publication Data
US 2023/0314572 A1    Oct. 5, 2023

(30) Foreign Application Priority Data
Aug. 18, 2020   (JP) .................................. 2020-137786

(51) Int. Cl.
*G01S 7/4863*   (2020.01)
*G01S 7/481*    (2006.01)
(Continued)

(52) U.S. Cl.
CPC .......... *G01S 7/4863* (2013.01); *G01S 7/4817* (2013.01); *G01S 7/4865* (2013.01); *G01S 7/489* (2013.01); *G01S 17/10* (2013.01)

(58) Field of Classification Search
CPC .... G01S 7/4863; G01S 7/4817; G01S 7/4865; G01S 7/489; G01S 17/10; G01S 7/4861; G01S 7/4868; G01S 17/42; G01S 7/4873
See application file for complete search history.

(56) References Cited

U.S. PATENT DOCUMENTS

| | | | |
|---|---|---|---|
| 5,396,288 A | 3/1995 | Tsugita et al. | |
| 9,304,203 B1 * | 4/2016 | Droz ....................... | G01S 17/88 |

(Continued)

FOREIGN PATENT DOCUMENTS

| | | |
|---|---|---|
| JP | H06-70222 A | 3/1994 |
| JP | 2011-117799 A | 6/2011 |

(Continued)

OTHER PUBLICATIONS

Machine Translation of Foreign Patent Document JP2016014535A (Year: 2016).*

(Continued)

*Primary Examiner* — Uzma Alam
*Assistant Examiner* — Paul Schnase
(74) *Attorney, Agent, or Firm* — Oliff PLC

(57) ABSTRACT

A photoelectric sensor includes: a first signal processing chain including a first amplifier configured to amplify an output signal from a preamplifier by a first amplification factor A1 and a first binarization circuit configured to binarize an output signal from the first amplifier by a first threshold Vth1; and a second signal processing chain including a second amplifier configured to amplify an output signal from the preamplifier by a second amplification factor A2 and a second binarization circuit configured to binarize an output signal from the second amplifier by a second threshold Vth2. The first threshold and the second threshold, and (Continued)

the first amplification factor and the second amplification factor satisfy the following relational expression: $1<(V_{th2}/V_{th1})<\alpha=(A2/A1)$.

7 Claims, 4 Drawing Sheets

(51) Int. Cl.
  *G01S 7/4865* (2020.01)
  *G01S 7/489* (2006.01)
  *G01S 17/10* (2020.01)

(56) References Cited

U.S. PATENT DOCUMENTS

| | | |
|---|---|---|
| 2011/0128547 A1 | 6/2011 | Beppu et al. |
| 2012/0069322 A1 | 3/2012 | Kostamovaara |
| 2017/0090019 A1* | 3/2017 | Slobodyanyuk ........ G01S 17/10 |
| 2019/0043599 A1 | 2/2019 | Livezey |
| 2019/0293770 A1 | 9/2019 | Subasingha et al. |

FOREIGN PATENT DOCUMENTS

| | | |
|---|---|---|
| JP | 2014-142340 A | 8/2014 |
| JP | 2016014535 A * | 1/2016 |
| JP | 2018-528437 A | 9/2018 |
| JP | 2019-028060 A | 2/2019 |

OTHER PUBLICATIONS

Nov. 9, 2021 Search Report issued in International Patent Application No. PCT/JP2021/030146.

Feb. 16, 2023 International Preliminary Report on Patentability issued in International Patent Application No. PCT/JP2021/030146.

* cited by examiner

PHOTOELECTRIC SENSOR AND OPTICAL RANGEFINDER

TECHNICAL FIELD

The present invention relates to a photoelectric sensor and an optical rangefinder.

BACKGROUND ART

Patent Literature 1 discloses a photoelectric sensor for detecting objects in a monitored area, where the sensor aims to amplify received signals as faithfully as possible to signals over a wide dynamic range.

The photoelectric sensor includes: a light emitter for emitting light, a light receiver for converting light diffusely reflected from an object into a photocurrent, and an evaluation unit for measuring characteristics of the object based on a received signal derived from the photocurrent. A high sensitivity receive path with a higher sensitivity amplifier and a low sensitivity receive path with a lower sensitivity amplifier are provided between the light receiver and the evaluation unit to detect the diffusely reflected light over a wider dynamic range. Depending on the intensity of the diffusely reflected light, the received signal is generated in the high sensitivity receive path or the low sensitivity receive path from the photocurrent divided between the receive paths.

At least the low sensitivity receive path includes a diode array, and a forward voltage of the diode array is used to define a threshold for the intensity of the diffusely reflected light. The photoelectric sensor is configured to make the photocurrent flow through the low sensitivity receive path only when the photocurrent exceeds the threshold.

The photoelectric sensor described above allows the received signal to be amplified within a wider dynamic range than the dynamic range of each individual receive path with little information loss. Only when the forward voltage is exceeded, the current flows into the amplifier of the low sensitivity receive path, and when the received output is small, the entire photocurrent is directed into the high sensitivity receive path, so that no sensitivity loss will occur.

CITATION LIST

Patent Literature

Patent Literature 1: Japanese Unexamined Patent Application Publication No. 2014-142340

SUMMARY OF INVENTION

Technical Problem

However, the photoelectric sensor disclosed in Patent Literature 1 requires an expensive transimpedance amplifier for each of the single or multiple low sensitivity and high sensitivity receive paths with the diode array, which leads to increased component costs.

It is an object of the present invention to provide an inexpensive photoelectric sensor and optical rangefinder that can properly detect light over a wide dynamic range without using multiple transimpedance amplifiers.

Solution to Problem

To achieve this object, a photoelectric sensor for detecting an object in a monitored area is provided in accordance with the present invention. As a first feature of the photoelectric sensor in accordance with the present invention, the photoelectric sensor includes: a light emitting unit configured to emit measurement light to the monitored area; a light receiving unit configured to convert reflected light into a current signal, the reflected light being a diffuse reflection of the measurement light from an object; a preamplifier configured to convert the current signal converted by the light receiving unit into a voltage signal; a first signal processing chain including a first amplifier and a first binarization circuit, the first amplifier being configured to amplify an output signal from the preamplifier by a first amplification factor $A1$, the first binarization circuit being configured to binarize an output signal from the first amplifier by a first threshold $Vth1$; and a second signal processing chain including a second amplifier and a second binarization circuit, the second amplifier being configured to amplify an output signal from the preamplifier by a second amplification factor $A2$, the second binarization circuit being configured to binarize an output signal from the second amplifier by a second threshold $Vth2$. The first threshold $Vth1$ and the second threshold $Vth2$, and the first amplification factor $A1$ and the second amplification factor $A2$ satisfy the following relational expression: $1<(Vth2/Vth1)<\alpha=(A2/A1)$.

The light receiving unit detects reflected light that is a diffuse reflection of the measurement light, emitted by the light emitting unit, from an object and converts it into a current signal, which is then converted by the preamplifier into a voltage signal to be input to the first signal processing chain and the second signal processing chain. In the first signal processing chain, the voltage signal is amplified by the first amplifier by the first amplification factor $A1$ and then binarized by the first binarization circuit by the first threshold $Vth1$ and output as a pulse signal. Similarly, in the second signal processing chain, the voltage signal is amplified by the second amplifier by the second amplification factor $A2$ ($A1<A2$) and then binarized by the second binarization circuit by the second threshold $Vth2$ ($Vth1<Vth2$) and output as a pulse signal. In addition, the first threshold $Vth1$ and the second threshold $Vth2$, and the first amplification factor $A1$ and the second amplification factor $A2$ satisfy the relational expression of $1<(Vth2/Vth1)<\alpha=(A2/A1)$, which ensures that, even if an input signal is at such a low level that the first signal processing chain cannot produce a binary output, the second signal processing chain can produce a binary output.

In addition to the first feature above, the photoelectric sensor in accordance with the present invention has a second feature that the photoelectric sensor further includes a distance calculation circuit configured to calculate a distance from the photoelectric sensor to an object based on an emission time of the measurement light emitted from the light emitting unit and a rising time of a binary signal output from the first signal processing chain or the second signal processing chain.

The distance calculation circuit calculates the optical time-of-flight from the photoelectric sensor to an object based on an emission time of the measurement light and a rising time of the binary signal, e.g., a detection time of the diffusely reflected light, and calculates the distance from the photoelectric sensor to the object based on the optical time-of-flight and the velocity of light.

In addition to the first or second feature above, the photoelectric sensor in accordance with the present invention has a third feature that the photoelectric sensor further includes a distance correction circuit configured to correct a distance calculated by the distance calculation circuit based on a pulse width of the binary signal.

A rising edge of a binary signal varies depending on the characteristics of a voltage signal input to the binarization circuit; the binary signal rises sharply when the voltage signal has a high peak value, and the binary signal rises gently when the voltage signal has a low peak value. Accordingly, a peak value of a voltage signal input to the binarization circuit can be estimated based on a pulse width, which is a time interval between the rising time and the falling time of the binary signal. Thus, the distance correction circuit determines a correction amount for the rising time of each binary signal such that the rising time of each binary signal corresponds to a rising time of a binary signal for a predefined reference voltage signal, and corrects the distance calculated by the distance calculation circuit by using a distance corresponding to the correction amount as a correction distance.

In addition to the second or third feature above, the photoelectric sensor in accordance with the present invention has a fourth feature that the photoelectric sensor further includes a time determining circuit configured to permit the distance calculation circuit to calculate a distance when a pulse width of the binary signal is greater than or equal to a predetermined threshold and prevent the distance calculation circuit from calculating a distance when the pulse width is less than the predetermined threshold.

When the pulse width of a binary signal produced for the light detected by the light receiving unit is very short compared to the pulse width of the measurement light, it can be determined that the binary signal corresponds to a disturbance. Thus, when the pulse width of a binary signal is greater than or equal to the predetermined threshold, the time determining circuit determines that the binary signal corresponds to true diffusely reflected light and permits the distance calculation circuit to calculate a distance, and when the pulse width is less than the predetermined threshold, the time determining circuit determines that the binary signal corresponds to a disturbance and prevents the distance calculation circuit from calculating a distance.

In addition to any one of the second to fourth features above, the photoelectric sensor in accordance with the present invention has a fifth feature that the photoelectric sensor further includes a signal selection circuit configured to select, for output to the distance calculation circuit, a binary signal output from the first signal processing chain when both of the first signal processing chain and the second signal processing chain concurrently output binary signals, and select a binary signal output from the second signal processing chain when only the second signal processing chain outputs a binary signal.

When a binary signal is output from each of the first signal processing chain with the lower gain first amplifier and the second signal processing chain with the higher gain second amplifier, gain compression may be occurring in the second amplifier in the second signal processing chain, causing waveform rounding. Thus, the signal selection circuit selects the binary signal output from the first signal processing chain, which ensures a more accurate distance calculation. Also, when a binary signal is output only from the second signal processing chain, the signal selection circuit selects that binary signal, which is produced by the higher gain second amplifier properly amplifying a weak voltage signal that could not be binarized by the first signal processing chain. This ensures a more proper distance calculation even from a weak voltage signal.

In addition to any one of the second to fourth features above, the photoelectric sensor in accordance with the present invention has a sixth feature that the photoelectric sensor further includes an output selection circuit configured to output a first distance calculated by the distance calculation circuit based on a binary signal output from the first signal processing chain when a difference between the first distance and a second distance calculated by the distance calculation circuit based on a binary signal output from the second signal processing chain is less than a predetermined distance threshold, and output the second distance when the second distance is greater than or equal to a predetermined far distance threshold.

When the difference between the first distance and the second distance is less than the predetermined distance threshold, the diffusely reflected light is likely to be from the same object, so that the output selection circuit outputs the first distance, which is obtained from the properly amplified binary signal output from the first signal processing chain. When the second distance is greater than or equal to the predetermined far distance threshold, the output selection circuit determines that it is difficult to calculate an accurate distance using the first signal processing chain with the lower gain first amplifier, and thus outputs the second distance with or without calculation of the first distance. As such, accurate distances can be output over a wide range of distances, from short to long distances from the photoelectric sensor.

In addition to the first feature above, the photoelectric sensor in accordance with the present invention has a seventh feature that the photoelectric sensor further includes an output interface circuit configured to output both output signals from the first signal processing chain and the second signal processing chain to an outside.

As both output signals from the first signal processing chain and the second signal processing chain are output to the outside via the output interface circuit, a user of the photoelectric sensor can flexibly calculate a distance by taking into account of characteristics of the first signal processing chain and the second signal processing chain according to use conditions of the photoelectric sensor.

An optical rangefinder is provided in accordance with the present invention. As a feature of the optical rangefinder in accordance with the present invention, the optical rangefinder includes: a photoelectric sensor having any one of the second to sixth features above; and a light deflection unit configured to deflect measurement light emitted from the light emitting unit in a predetermined direction and/or an optical scanning unit configured to deflect and scan with measurement light emitted from the light emitting unit in a predetermined direction.

Employing a light deflection unit and/or an optical scanning unit for deflecting, or scanning with, the measurement light emitted from the light emitting unit of the photoelectric sensor having any of the features above can provide for an optical rangefinder that can calculate a distance to an object present in a particular direction.

Advantageous Effects of Invention

As described above, the present invention can provide an inexpensive photoelectric sensor and optical rangefinder that can properly detect light over a wide dynamic range without using multiple transimpedance amplifiers.

BEST MODE FOR CARRYING OUT THE INVENTION

An embodiment of a photoelectric sensor and an optical rangefinder in accordance with the present embodiment is described below.

Figure 1:
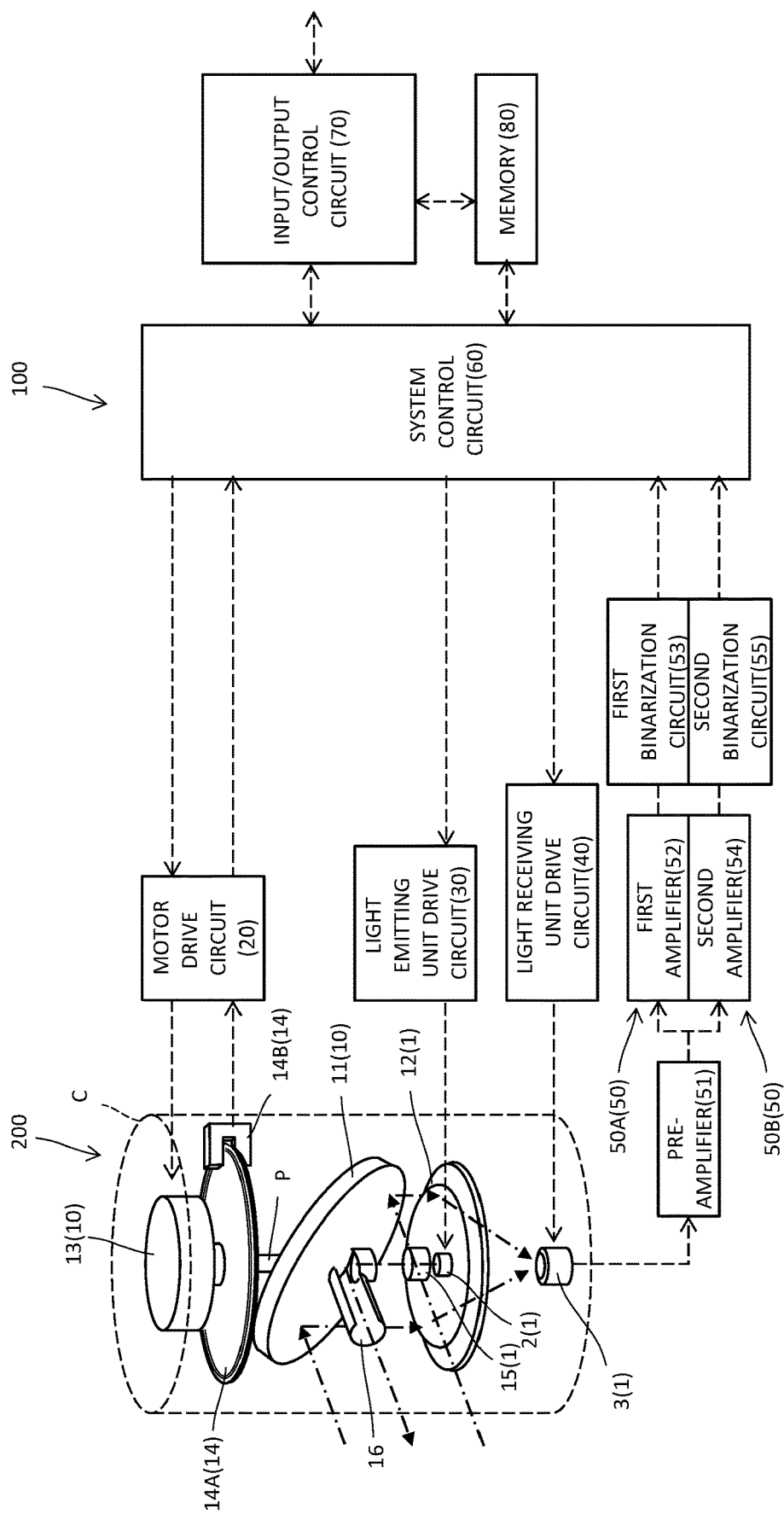
FIG. 1 illustrates a configuration of an optical rangefinder with a photoelectric sensor.

FIG. 1 illustrates an optical rangefinder 200 with a photoelectric sensor 1 and a signal processing circuit 100 integrated in the photoelectric sensor 1. The optical rangefinder 200 includes the photoelectric sensor 1 to detect objects in a monitored area and an optical scanning unit 10 to scan the monitored area with measurement light emitted from the photoelectric sensor 1 and guide reflected light diffusely reflected from a surface of an object present in the monitored area to the photoelectric sensor 1. The photoelectric sensor 1 and the optical scanning unit 10 are housed in a casing C (shown as a dashed-lined cylindrical body in the figure) with a light transmissive window.

The photoelectric sensor 1 includes: a light emitting unit 2 to emit measurement light toward the monitored area through the light transmissive window of the casing C; a projection lens 15; a collecting lens 12 to collect reflected light that is a diffuse reflection of the measurement light, as shaped by the projection lens 15, from an object present in the monitored area; a light receiving unit 3 to receive the reflected light collected by the collecting lens 12 and convert it into a current signal; and a signal processing circuit 100 to process the current signal converted by the light receiving unit 3. The signal processing circuit 100 is configured with multiple circuit elements mounted on a board, and is actually housed in a bottom portion of the casing C, etc.

The optical scanning unit 10 includes: a deflection mirror 11 to deflect the measurement light emitted from the light emitting unit 2 toward the monitored area and guide the reflected light from the object to the light receiving unit 3; a motor 13 to rotate the deflection mirror 11 about a rotary shaft P; and an encoder 14 to detect a rotation speed of the motor 13. The encoder 14 is configured with a disc 14A that has slits at predetermined intervals on its outer periphery and rotates about the rotary shaft P and a transmissive photointerrupter 14B to detect light passing through the slits formed on the disc 14A.

The deflection mirror 11 is fixed at a 45 degree orientation relative to the rotary shaft P, and the light receiving unit 3, the collecting lens 12, the light emitting unit 2, and the projection lens 15 are arranged on the axis of the rotary shaft P. The measurement light emitted from the light emitting unit 2 is shaped into parallel light as it passes through the projection lens 15, and then propagates along the light guide 16. The measurement light is then deflected at right angles by the deflection mirror 11 and emitted to the monitored area while being deflected for scanning along with rotation of the deflection mirror 11.

The reflected light from the object propagates through the space around the light guide 16 and impinges on the deflection mirror 11, where the reflected light is deflected in the axial direction of the rotary shaft P. The reflected light then passes through the collecting lens 12 to enter the light receiving unit 3. A laser diode that emits laser light in the near infrared range is used as the light emitting unit 2, and an avalanche photodiode (hereinafter also referred to as an "avalanche photodiode 3") is used as the light receiving unit 3.

The signal processing circuit 100 includes a motor drive circuit 20, a light emitting unit drive circuit 30, a light receiving unit drive circuit 40, a received signal processing circuit 50, a system control circuit 60, an input/output control circuit 70, and a memory 80.

The system control circuit 60 is configured with an FPGA or the like. The system control circuit 60 is a circuit block to control the motor drive circuit 20, the light emitting unit drive circuit 30, the light receiving unit drive circuit 40, and the received signal processing circuit 50 and to perform rangefinding operations and store operation results in the memory 80.

The input/output control circuit 70 is a circuit block to read the operation results stored in the memory 80 for necessary processing and exchange signals, such as processing results, with external devices via Ethernet®. It should be noted that the communication interface with external devices is not limited to Ethernet®.

The motor drive circuit 20 is a circuit to transmit pulse signals from the encoder 14 to the system control circuit 60 and drive the motor 13 based on control signals from the system control circuit 60.

The light emitting unit drive circuit 30 is a circuit to pulse the laser diode constituting the light emitting unit 2 based on control signals from the system control circuit 60. The system control circuit 60 identifies a rotational position of the deflection mirror 11 based on pulse signals from the encoder 14 and also identifies the timings to drive the laser diode and outputs control signals to the light emitting unit drive circuit 30.

Figure 2:
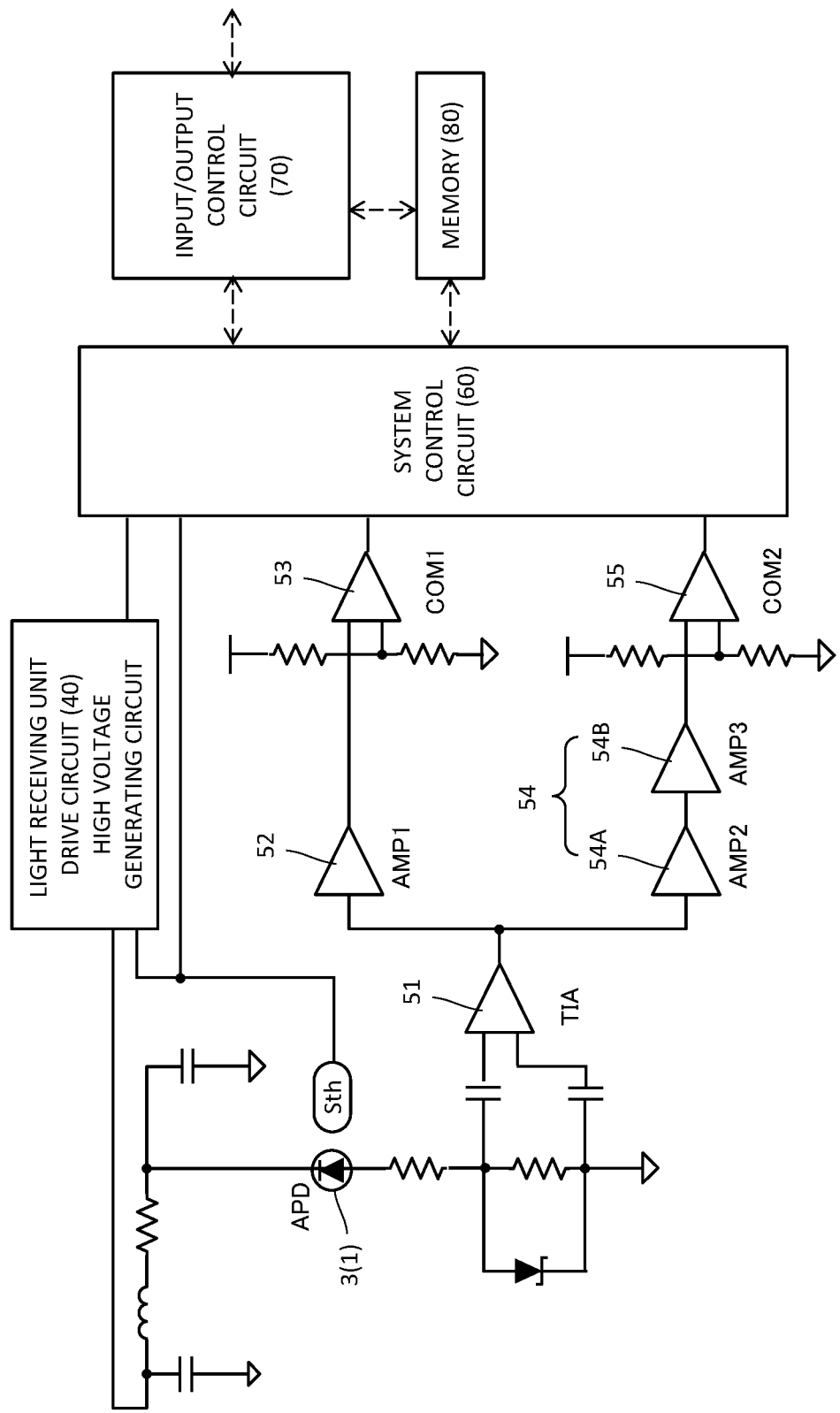
FIG. 2 illustrates a signal processing circuit in the photoelectric sensor.

As shown in FIG. 2, the light receiving unit drive circuit 40 is a circuit to control a driving voltage for the avalanche photodiode 3 constituting the light receiving unit 3. The light receiving unit drive circuit 40 includes a temperature sensor Sth to detect the temperature in the vicinity of the light receiving unit 3, and includes a high voltage generating circuit. The light receiving unit drive circuit 40 adjusts an output voltage from the high voltage generating circuit based on control signals from the system control circuit 60. The system control circuit 60 variably controls the output voltage from the high voltage generating circuit near a predetermined voltage (about 150V in the present embodiment) in order to compensate for temperature characteristics of the light receiving unit 3 based on output from the temperature sensor.

As shown in FIGS. 1 and 2, the received signal processing circuit 50 is a circuit to process a current signal that is photoelectrically converted from the reflected light by the avalanche photodiode 3. The received signal processing circuit 50 includes: a preamplifier 51 to convert a current signal into a voltage signal, where the preamplifier 51 uses a transimpedance amplifier; a first signal processing chain 50A including a first amplifier 52 to amplify an output signal from the preamplifier 51 by a first amplification factor A1 and a first binarization circuit 53 to binarize an output signal from the first amplifier 52 by a first threshold Vth1; and a second signal processing chain 50B including a second amplifier 54 to amplify an output signal from the preamplifier 51 by a second amplification factor A2 and a second binarization circuit 55 to binarize an output signal from the second amplifier 54 by a second threshold Vth2.

The current signal photoelectrically converted by the avalanche photodiode 3 is divided via a resistive voltage divider circuit and then converted to an AC signal with a DC component removed via a coupling capacitor before being input to preamplifier 51.

The first amplifier 52 is configured with an inverting amplifier AMP1 using an operational amplifier, and the second amplifier 54 is configured with an inverting amplifier AMP2 (54A) using an operational amplifier and a differential amplifier AMP3 (54B). The second amplifier 54 may be a single inverting amplifier.

The first threshold Vth1 and the second threshold Vth2 are set to satisfy the following relational expression:

$$1 < (Vth2/Vth1) < \alpha = (A2/A1)$$

That is, Vth1<Vth2<α×Vth1, and 1<α=A2/A1.

This ensures that, even if an input signal is at such a low level that the first signal processing chain 50A cannot produce a binary output, the second signal processing chain 50B can produce a binary output.

In the present embodiment, the amplification factor for the preamplifier 51 is set to 80 dB, the first amplification factor A1 for the first amplifier 52 is set to 16 dB, and the second amplification factor A2 for the second amplifier 54 is set to 41 dB. The value a of the ratio of the second amplification factor A2 to the first amplification factor A1 as expressed in antilogarithmic form (α=A2/A1) is equal to the value of difference between the amplification factors as expressed in logarithmic form (25 dB (=41 dB−16 dB)). Accordingly, the value a of the ratio of the amplification factors is about 17.8, which is greater than 1.

Also, the first threshold Vth1 is set to 0.16 V, and the second threshold Vth2 is set to 0.40 V. The value of the ratio of the second threshold Vth2 to the first threshold Vth1 as expressed in antilogarithmic form is 2.5, which is greater than 1 and smaller than the value a, satisfying the above relational expression. The value of difference of the second threshold Vth2 relative to the first threshold value Vth1 as expressed in logarithmic form is 7.96 dB, which is greater than 0 dB and smaller than the value of difference of the second amplification factor A2 relative to the first amplification factor A1 as expressed in logarithmic form (25 dB).

In other words, the first signal processing chain 50A is a low sensitivity signal processing chain, and the second signal processing chain 50B is a high sensitivity signal processing chain. An output signal from the preamplifier 51 is provided to each of the first signal processing chain 50A and the second signal processing chain 50B. Thus, even with an input signal that is at such a low level that the low sensitivity first signal processing chain 50A cannot produce a binary output, the high sensitivity second signal processing chain 50B can produce a binary output.

In addition to controlling the motor drive circuit 20, the light emitting unit drive circuit 30, and the light receiving unit drive circuit 40 described above, the system control circuit 60 includes other circuits such as a distance calculation circuit, a distance correction circuit, and a time determining circuit. The input/output control circuit 70 includes circuits such as an output selection circuit. The distance calculation circuit, the distance correction circuit, and the time determining circuit operate at each scanning by the optical scanning unit 10 to calculate a distance to an object within the monitored area as well as a scanning angle, and store the calculation results in the memory 80.

Signals binarized by the first binarization circuit 53 in the first signal processing chain 50A and signals binarized by the second binarization circuit 55 in the second signal processing chain 50B are input to the distance calculation circuit in the system control circuit 60, where a time-to-digital converter in the distance calculation circuit calculates a time difference between an output time of the drive signal to the light emitting unit 2 and a rising time of the binary signal for the photoelectrically converted reflected light. The distance to an object is calculated based on the time difference and the velocity of light. Also, the scanning angle of the measurement light can be determined from the rotational position (scanning angle) of the deflection mirror 11 at each emission of the measurement light, which can be identified based on the pulse signal from the encoder 14. As such, the distance and direction to the object can be determined.

In other words, the distance calculation circuit is configured to calculate the distance from the photoelectric sensor to the object based on the emission time of the measurement light from the light emitting unit 2 and the rising time of the binary signal output from the first signal processing chain 50A or the second signal processing chain 50B.

Figure 3:
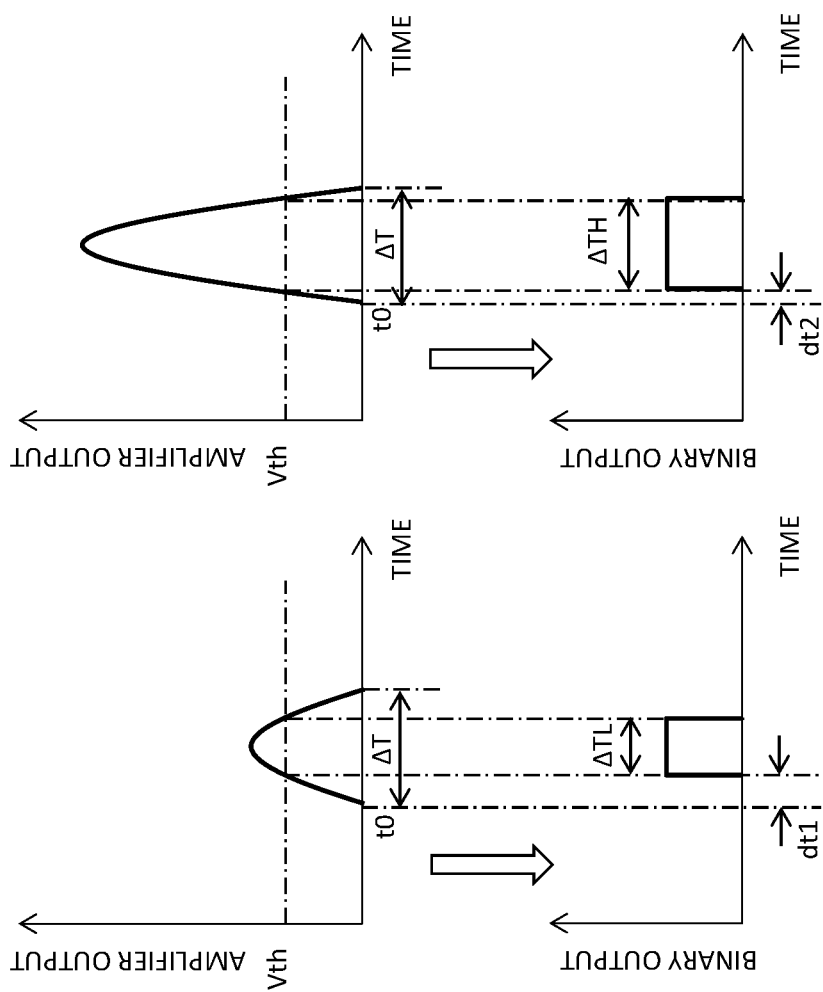
FIG. 3 illustrates relationship between the magnitude of an output signal from an amplifier and a binary signal.

As shown in FIG. 3, voltage signals corresponding to the reflected light amplified by the amplifiers 52, 54 have different peak values and different rising slopes even during the same time interval ΔT between a rising time when the signals rise from the ground level and a falling time when the signals fall to the ground level. Thus, even if the voltage signals are binarized by the same threshold Vth, the binary signal corresponding to the voltage signal with the lower peak value has a slower rising time and a shorter pulse width than the binary signal corresponding to the voltage signal with the higher peak value (in FIG. 3, the pulse width of the binary signal corresponding to the voltage signal with the lower peak value is denoted as ΔTL, and the pulse width of the binary signal corresponding to the voltage signal with the higher peak value is denoted as ΔTH).

Thus, the rising time of the binary signal varies depending on the characteristics of the voltage signal input to the binarization circuits 53, 55; the binary signal rises sharply when the voltage signal has a high peak value, and the binary signal rises gently when the voltage signal has a low peak value. There is a predetermined correlation between the pulse width, which represents the time interval between the rising time and the falling time of the binary signal, and a time difference between a time point t0 at which the reflected light originally arrived and the rising time of the binary signal. Accordingly, a time difference (e.g., dt1, dt2) between the time point t0 at which the reflected light originally arrived and the rising time of any binary signal can be estimated based on the pulse width (e.g., ΔTL, ΔTH) of the binary signal.

Therefore, a correction table for determining, from the pulse width of the binary signal for any voltage signal and based on the above correlation, the time difference dt relative to the time point t0 at which the reflected light originally arrived is provided in advance to determine the correction amount (time difference dt). It should be noted that a correction formula can be used instead of the correction table.

In practice, in order to remove the effects of component variations and mechanical tolerances of the light emitting unit 2, the light receiving unit 3, and circuit elements in the optical rangefinder 200, a voltage signal for reflected light from a reference reflector that is housed in the casing C and for which a reference distance is known is detected as a reference voltage signal, and a correction factor is determined for correcting the time difference dt relative to the rising time point t0 of the reference voltage signal such that a distance determined from a time difference between the output time of the drive signal to the light emitting unit 2 and the rising time of the signal binarized from the reference voltage signal is equal to the reference distance. Each correction amount (time difference dt) in the above correction table is corrected by this correction factor.

The distance correction circuit determines the correction amount (time difference dt) for any binary signal using the correction table and calculates a correction distance based on the correction amount as corrected by the above correction factor, where the correction distance is used to increase or decrease the distance calculated by the above distance calculation circuit. It should be noted that the distance correction circuit may have separate correction tables respectively for the first signal processing chain 50A and the second signal processing chain 50B.

The time determining circuit is configured to permit the distance calculation circuit to calculate a distance when the pulse width of a binary signal is greater than or equal to a predetermined threshold and prevent the distance calculation circuit from calculating a distance when the pulse width of a binary signal is less than the predetermined threshold.

When the pulse width of a binary signal produced for light detected by the light receiving unit 3 is very short compared to the pulse width of the measurement light, it can be determined that the binary signal corresponds to a disturbance. Thus, when the pulse width of a binary signal is greater than or equal to the predetermined threshold, the time determining circuit determines that the binary signal corresponds to true diffusely reflected light and permits the distance calculation circuit to calculate a distance, and when the pulse width is less than the predetermined threshold, the time determining circuit determines that the binary signal corresponds to a disturbance and prevents the distance calculation circuit from calculating a distance. The predetermined threshold is preferably set to any value in the range of 0.2 to 0.4 times the pulse width of the measurement light, though the threshold is not limited to such values. The predetermined threshold may be at least set to any value less than the pulse width of the measurement light.

In this way, the distance and direction to the object is calculated for each binary signal input via the first signal processing chain 50A and the second signal processing chain 50B. Further, each calculated value is subjected to a filtering process, and the distance and direction that are determined to be associated with a proper object for detection are stored in the memory 80.

For example, the filtering process can employ a size determination filter, such that when an object is detected consecutively for a predetermined number of times along adjacent scanning directions and a difference between respective distances is within a predetermined value, the object is determined to be a valid object, and otherwise the object is removed as noise. This process can remove disturbances such as raindrops and fogs.

The output selection circuit in the input/output control circuit 70 reads the distance and direction written in the memory 80 at each scanning cycle and calculates a difference between a first distance corresponding to the first signal processing chain 50A and a second distance corresponding to the second signal processing chain 50B. When the difference is less than a predetermined distance threshold, namely when the relevant objects can be determined to be the same object, the output selection circuit outputs the first distance to an external device.

When the difference between the first distance and the second distance is less than the predetermined distance threshold, the diffusely reflected light is likely to be from the same object, so that the output selection circuit outputs the first distance, which is obtained from the properly amplified binary signal output from the first signal processing chain. When the second distance is greater than or equal to a predetermined far distance threshold, the output selection circuit determines that it is difficult to calculate an accurate distance using the first signal processing chain with the lower gain first amplifier, and thus outputs the second distance with or without calculation of the first distance. As such, accurate distances can be output over a wide range of distances, from short to long distances from the photoelectric sensor.

Also, the output selection circuit is configured to output the second distance when the second distance is greater than or equal to the predetermined far distance threshold. This is because the high sensitivity second signal processing chain 50B can detect even distant objects that cannot be detected by the low sensitivity first signal processing chain 50A.

Further, the output selection circuit has a near distance removing function such that the output selection circuit does not provide any output when the detected distance to an object is less than a predetermined near distance threshold. This prevents situations where the output selection circuit outputs reflected light caused by dirt on the casing C as a valid object. Different values of the near distance threshold may be set for the low sensitivity first signal processing chain 50A and the high sensitivity second signal processing chain 50B.

Figure 4:
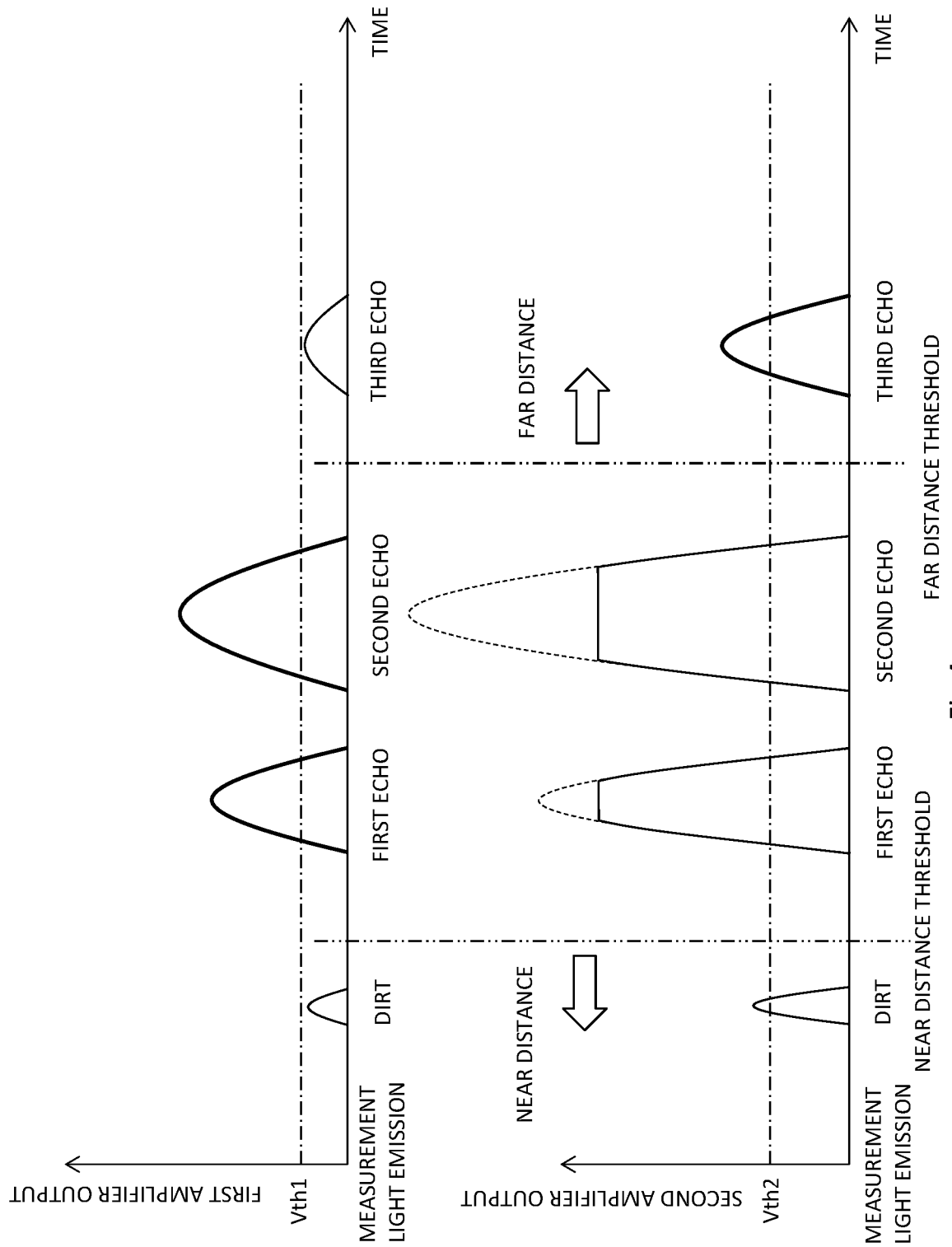
FIG. 4 illustrates output signals from a first amplifier and a second amplifier for the same input signal.

FIG. 4 illustrates output signals from the first amplifier 52 in the first signal processing chain 50A and from the second amplifier 54 in the second signal processing chain 50B for measurement light emitted at a scanning angle. The figure illustrates a near distance signal for reflected light caused by dirt on the casing C, a first echo signal, a second echo signal, and a third echo signal.

In this case, the output selection circuit described above removes signals less than the near distance threshold, which correspond to dirt, and determines the distances of the approximately equidistant first and second echo signals based on binary signals obtained by binarizing the output signals from the first amplifier 52 in the first signal processing chain 50A, and determines the distance of the third echo signal, which is greater than or equal to the far distance threshold, based on a binary signal obtained by binarizing the output signal from the second amplifier 54 in the second signal processing chain 50B. As shown in FIG. 4, the signal waveforms of the first and second echoes amplified by the second amplifier 54 are oversaturated, so that it is difficult to calculate accurate distances thereof.

When the first echo is determined to be a signal corresponding to an invalid object, e.g., rain or fog, by the above filtering process, the output selection circuit is configured not to provide any output as it determines the first echo to be an invalid signal. Other alternative systems can be employed that select and utilize echoes in combination with various filtering processes suitable for particular purposes, such as a system that prioritizes the distance of the first echo at a near range in order to prevent collisions and a system that utilizes the second echo in order to detect any object behind a thin object.

Another embodiment is described below.

The functions of the output selection circuit described in the above embodiment may be provided in the system control circuit 60. Specifically, the system control circuit 60 may be configured to select, for output to the distance calculation circuit, a binary signal output from the first signal processing chain 50A when both of the first signal processing chain 50A and the second signal processing chain 50B concurrently output binary signals, and select a binary signal output from the second signal processing chain 50B when only the second signal processing chain 50B outputs a binary signal. The situation where both of the first and second signal processing chain 50A, 50B concurrently output binary signals refers to a situation where a time difference between rising edges of the binary signals is within a predetermine allowable range.

Although the above embodiment describes the optical rangefinder 200 including the optical scanning unit 10 that deflects and scans with the measurement light emitted from the light emitting unit 2 in the photoelectric sensor 1 in predetermined directions, it is also possible to configure the optical rangefinder with a light deflection unit that deflects the measurement light emitted from the light emitting unit in one predetermined direction.

Although the above embodiment describes the photoelectric sensor 1 integrated in the optical rangefinder 200, a separate photoelectric sensor 1 may be used.

An output interface circuit may also be included that outputs both of the output signals from the first signal processing chain 50A and the second signal processing chain 50B in the photoelectric sensor 1 to the outside as they are, along with signals indicative of emission times of the corresponding measurement light. This allows a user of the photoelectric sensor 1 to flexibly calculate a distance by taking into account of characteristics of the first signal processing chain and the second signal processing chain according to use conditions of the photoelectric sensor.

The received signal processing circuit 50 in the above embodiment includes the preamplifier 51 using the transimpedance amplifier TIA for converting current signals, which are photoelectrically converted from reflected light by the avalanche photodiode 3, into voltage signals, and output signals from the preamplifier 51 are provided to each of the first signal processing chain 50A and the second signal processing chain 50B. However, the received signal processing circuit 50 may further include an nth signal processing chain 50n including an nth amplifier to amplify output signals from the preamplifier 51 by an nth amplification factor An and an nth binarization circuit to binarize output signals from the nth amplifier by an nth threshold Vthn (n is an integer greater than 2).

An (n−1)th signal processing chain and the nth signal processing chain may be set such that an (n−1)th threshold Vth(n−1) and the nth threshold Vthn, and an (n−1)th amplification factor A(n−1) and the nth amplification factor An satisfy the following relational expression:

$$1 < (Vthn/Vth(n-1)) < \alpha = (An/A(n-1))$$

This ensures that, even if an input signal is at such a low level that the (n−1)th signal processing chain cannot produce a binary output, the nth signal processing chain can produce a binary output.

The nth signal processing chain 50n may be provided as a signal processing chain with intermediate sensitivity between the low sensitivity first signal processing chain 50A and the high sensitivity second signal processing chain 50B. The requirement is that the first signal processing chain 50A and the second signal processing chain 50B at least satisfy the relational expression of $1<(Vth2/Vth1)<\alpha=(A2/A1)$, so that the received signal processing circuit 50 may include the nth amplifier to amplify output signals from the preamplifier 51 by the nth amplification factor An and the nth binarization circuit to binarize output signals from the nth amplifier by the nth threshold Vthn.

The embodiments described above are merely examples of the invention, and the descriptions of the embodiments do not limit the scope of the present invention. It will be readily appreciated that various changes and modifications can be made to the components discussed herein as appropriate to the extent that such changes and modifications still provide the functions and benefits of the present invention.

INDUSTRIAL APPLICABILITY

The present invention can provide an inexpensive photoelectric sensor and optical rangefinder that can properly detect light over a wide dynamic range without using multiple transimpedance amplifiers.

REFERENCE SIGNS LIST

1 Photoelectric sensor
2 Light emitting unit
3 Light receiving unit
10 Optical scanning unit
11 Deflection mirror
12 Collecting lens
20 Motor drive circuit
30 Light emitting unit drive circuit
40 Light receiving unit drive circuit
50 Received signal processing circuit
50A First signal processing chain
50B Second signal processing chain
51 Preamplifier
52 First amplifier
53 First binarization circuit
54 Second amplifier
55 Second binarization circuit
60 System control circuit
70 Input/output control circuit
80 Memory
100 Signal processing circuit

The invention claimed is:

1. A photoelectric sensor for detecting an object in a monitored area, comprising:
   a light emitting unit configured to emit measurement light to the monitored area;
   a light receiving unit configured to convert reflected light into a current signal, the reflected light being a diffuse reflection of the measurement light from an object;
   a preamplifier configured to convert the current signal converted by the light receiving unit into a voltage signal;
   a first signal processing chain including a first amplifier and a first binarization circuit, the first amplifier being configured to amplify a preamplified signal output from the preamplifier by a first amplification factor A1, the first binarization circuit being configured to binarize a first output signal output from the first amplifier using a first threshold Vth1;
   a second signal processing chain including a second amplifier and a second binarization circuit, the second amplifier being configured to amplify the preamplified signal output from the preamplifier by a second amplification factor A2, the second binarization circuit being configured to binarize a second output signal output from the second amplifier using a second threshold Vth2;
   a distance calculation circuit configured to calculate (i) a first distance from the photoelectric sensor to an object based on an emission time of the measurement light emitted from the light emitting unit and a rising time of a first binary signal output from the first signal processing chain and (ii) a second distance from the photoelectric sensor to the object based on the emission time of the measurement light emitted from the light emitting unit and a rising time of a second binary signal output from the second signal processing chain, wherein the calculated first distance and second distance are written into a memory; and an output selection circuit configured to output the first distance and not output the second distance in response to determining that a difference between the first distance read from the memory and the second distance read from the memory is less than a predetermined distance threshold, wherein the first threshold Vth1 and the second threshold Vth2, and the first amplification factor A1 and the second amplification factor A2 are set so as to satisfy the following relational expression:

$$1<(Vth2/Vth1)<\alpha=(A2/A1).$$

2. The photoelectric sensor according to claim 1, wherein the output selection circuit outputs the second distance when the second distance is greater than or equal to a predetermined far distance threshold.

3. The photoelectric sensor according to claim 1, further comprising a distance correction circuit configured to correct a distance calculated by the distance calculation circuit based on a pulse width of the first binary signal or the second binary signal.

4. The photoelectric sensor according to claim 1, further comprising a time determining circuit configured to permit the distance calculation circuit to calculate a distance when a pulse width of a binary signal is greater than or equal to a predetermined threshold and prevent the distance calculation circuit from calculating a distance when the pulse width is less than the predetermined threshold.

5. The photoelectric sensor according to claim 1, further comprising a signal selection circuit configured to select, for output to the distance calculation circuit, the first binary signal output from the first signal processing chain when both of the first signal processing chain and the second signal processing chain concurrently output binary signals, and select the second binary signal output from the second signal processing chain when only the second signal processing chain outputs a binary signal.

6. The photoelectric sensor according to claim 1, further comprising an output interface circuit configured to output both the first and second binary signals output from the first signal processing chain and the second signal processing chain to an external device.

7. An optical rangefinder comprising:
a photoelectric sensor according to claim 1; and
a light deflection mirror configured to deflect measurement light emitted from the light emitting unit in a predetermined direction and/or an optical scanning device including a mirror and a motor for rotating the mirror, the optical scanning device configured to deflect and scan with measurement light emitted from the light emitting unit in a predetermined direction.

* * * * *